US007001865B2

United States Patent
Tada et al.

(10) Patent No.: US 7,001,865 B2
(45) Date of Patent: Feb. 21, 2006

(54) CATALYST FOR USE IN FUEL ELECTRODE OF POLYMER SOLID ELECTROLYTE TYPE FUEL CELL

(75) Inventors: Tomoyuki Tada, Hiratsuka (JP); Masahiko Inoue, Hiratsuka (JP)

(73) Assignee: Tanaka Kikinzoku Kogyo K.K., Tokyo (JP)

( * ) Notice: Subject to any disclaimer, the term of this patent is extended or adjusted under 35 U.S.C. 154(b) by 0 days.

(21) Appl. No.: 10/484,962

(22) PCT Filed: Apr. 11, 2003

(86) PCT No.: PCT/JP03/04613

§ 371 (c)(1),
(2), (4) Date: Jan. 28, 2004

(87) PCT Pub. No.: WO03/088387

PCT Pub. Date: Oct. 23, 2003

(65) Prior Publication Data

US 2004/0219420 A1 Nov. 4, 2004

(30) Foreign Application Priority Data

Apr. 12, 2002 (JP) .............................. 2002-110211

(51) Int. Cl.
*B01J 21/18* (2006.01)
*B01J 23/40* (2006.01)
*H01M 4/88* (2006.01)
*H01M 4/86* (2006.01)

(52) U.S. Cl. ...................... 502/185; 502/101; 502/182; 502/325; 429/40

(58) Field of Classification Search .............. 502/101, 502/185, 182, 325; 429/40
See application file for complete search history.

(56) References Cited

U.S. PATENT DOCUMENTS

| | | | | |
|---|---|---|---|---|
| 6,284,402 | B1 * | 9/2001 | Mallouk et al. | 429/40 |
| 6,326,098 | B1 * | 12/2001 | Itoh et al. | 429/40 |
| 6,339,038 | B1 * | 1/2002 | Tada et al. | 502/326 |
| 6,498,121 | B1 * | 12/2002 | Gorer | 502/325 |
| 6,551,960 | B1 * | 4/2003 | Laine et al. | 502/327 |
| 2003/0008198 | A1 * | 1/2003 | Mukoyama et al. | 429/42 |
| 2003/0176277 | A1 * | 9/2003 | Suh et al. | 502/180 |
| 2004/0126631 | A1 * | 7/2004 | Uchida et al. | 429/13 |
| 2004/0184983 | A1 * | 9/2004 | Paparatto et al. | 423/584 |

FOREIGN PATENT DOCUMENTS

| | | |
|---|---|---|
| JP | 10-334925 A | 12/1998 |
| JP | 11-250918 A | 9/1999 |
| JP | 2000-3712 A | 1/2000 |
| JP | 2000-12043 A | 1/2000 |

(Continued)

*Primary Examiner*—J. A. Lorengo
*Assistant Examiner*—Patricia L. Hailey
(74) *Attorney, Agent, or Firm*—Rothwell, Figg, Ernst & Manbeck, P.C.

(57) ABSTRACT

The present invention is a catalyst for use in a fuel electrode of a polymer solid electrotype fuel cell which is formed by making a carbon powder support platinum and ruthenium thereon, and is characterized in that the loading ratio between platinum and ruthenium is from 1:2.5 to 1:4 (in molar ratio). It is preferable that the loading density of the catalyst is 40 to 70%. Additionally, it is preferable that a carbon powder having a specific surface area of 600 to 1,200 $m^2/g$ is used as the carrier supporting the catalyst particles.

3 Claims, 1 Drawing Sheet

FOREIGN PATENT DOCUMENTS

| | | |
|---|---|---|
| JP | 2002-358971 A | 12/2002 |
| JP | 2003-24798 A | 1/2003 |
| JP | 2003-170725 A | 1/2003 |
| JP | 2003-187851 A | 7/2003 |
| WO | WO 01/15247 A2 | 3/2001 |
| WO | WO 01/15254 A2 | 3/2001 |

* cited by examiner

CATALYST FOR USE IN FUEL ELECTRODE OF POLYMER SOLID ELECTROLYTE TYPE FUEL CELL

CROSS REFERENCE TO RELATED APPLICATION

This application is a 35 USC § 371 National Phase Entry Application from PCT/JP03/04613, filed Apr. 11, 2003, and designating the U.S.

TECHNICAL FIELD

The present invention relates to a catalyst for use in a polymer solid electrolyte type fuel cell, particularly, to a catalyst used in a fuel electrode of a polymer solid electro-type type fuel cell.

BACKGROUND ART

Fuel cells are highly expected as electricity generation systems, among which polymer solid electrolyte type fuel cells, which use polymer electrolytes as the electrolytes, have lower operation temperatures and are compact as compared to phosphoric acid type fuel cells and the like, accordingly are regarded as promising as power supplies for electric cars.

Now, a polymer solid electrolyte type fuel cell has a laminate structure comprising two electrodes, namely, a fuel electrode and an air electrode, and a polymer solid electrolyte film sandwiched between these electrodes; the fuel electrode is supplied with a hydrogen containing fuel and the air electrode is supplied with oxygen or air, and thus the electric power is generated by the oxidation and reduction reactions occurring in the respective electrodes. To these two electrodes, a mixture containing a catalyst for accelerating the chemical reactions and a solid electrolyte is generally applied. As the catalysts constituting the electrodes, widely used are platinum catalysts in which platinum, satisfactory in catalytic activity, is made to be supported.

Different characteristics are demanded for a catalyst for use in a polymer solid electrolyte type fuel cell; the demanded characteristics for the fuel electrode and those for the air electrode are probably different from each other. The catalyst for use in the fuel electrode is demanded to have the resistance to catalyst poisoning due to carbon monoxide, in addition to high catalytic activity. As the hydrogen supplied to the fuel electrode, the reformed hydrogen obtained from methanol or the like is regarded as promising; however, carbon monoxide is contained in the reformed hydrogen as an impurity, and a problem occurs that the carbon monoxide is adsorbed on the catalyst particles to deactivate the catalyst. This is the reason why the resistance to catalyst poisoning due to carbon monoxide is demanded. Accordingly, for the purpose of improving the resistance to catalyst poisoning due to carbon monoxide, supported ruthenium catalysts are widely applied as the catalyst for the fuel electrode, in addition to supported platinum catalysts.

In these years, however, the practical use of polymer solid electrolyte type fuel cells comes to be established, and in this context a new problem is confirmed to be involved in the catalyst for use in the fuel electrode. This problem is the one that the cell characteristics are degraded when the fuel becomes deficient during the fuel cell operation. More specifically, when some abnormal condition somehow occurs in fuel supply during the steady operation of a fuel cell, the activity of the catalyst in the fuel electrode is degraded owing to the fuel deficiency and the cell characteristics are degraded, causing trouble in steady supply of electric power.

Additionally, when such catalyst activity degradation due to fuel deficiency occurs, if the catalyst activity is recovered by the fuel supply that is once again made normal, the cessation of the electric power supply is temporal and nonfatal. However, according to the previous reports, the catalyst activity degradation caused by the fuel deficiency is irreversible in nature, and it has been confirmed that the catalyst activity is not fully recovered by once again supplying the fuel.

As a countermeasure against the irreversible deactivation of the catalyst caused by the fuel deficiency, the establishment of a system free from cessation of fuel supply can be said most important. However, even if such a peripheral system can be improved, on the assumption of a worse case scenario, it is also preferable to improve the catalyst of the fuel electrode and the fuel cell themselves so that the characteristics thereof may not be degraded when the fuel becomes deficient.

Now, as one of the remedies having hitherto been studied for the fuel cell catalyst, for example, the addition of ruthenium oxide ($RuO_2$) or iridium oxide ($IrO_2$) to the catalyst layer has been known. Additionally, it has been claimed to be effective that, as additional remedies for improvement, the adopted carrier is made to be a carrier stable in oxidation properties such as graphitized carbon, titanium oxide ($Ti_4O_7$) and the like, and moreover, the amount of the supported catalyst particles is increased (for details of these remedies for improvement, see the international publication gazettes, WO 01/1527, WO 01/152547).

However, according to the investigation conducted by the present inventors, these remedies can be effective to a certain extent but not necessarily to a sufficient extent, and yield non-negligible degradation in characteristics when the fuel is deficient. Accordingly, as for the catalyst for use in the fuel electrode, it is necessary to find additional improvements other than these remedies.

The present invention has been made with the background described above, and takes as its object the provision of a catalyst hardly degradable in catalytic activity even when the fuel deficiency occurs, as the catalyst for use in the fuel electrode of a polymer solid electrolyte type fuel cell.

DISCLOSURE OF THE INVENTION

For the purpose of achieving the above described object, the present inventors have studied at the beginning the factor contributing to the degradation of the catalytic activity in the catalyst for use in the fuel electrode when the fuel becomes deficient. Consequently, the present inventors have considered that the factor involves the variation of the dominating reaction type in the fuel electrode when the fuel becomes deficient.

In the usual condition where the fuel is being supplied, protons are supplied to the fuel electrode through the electrolysis of hydrogen molecules, generating the source for the electric power generation. In other words, usually the decomposition reaction of hydrogen molecules is dominant in the fuel electrode, where the potential of the fuel electrode is approximately taken as 0 V (vs. the standard hydrogen electrode). On the other hand, when the fuel becomes deficient, the electrolysis reaction of water occurs in the fuel electrode to supply protons coming short therein, this reaction becoming dominant. The potential for the electrolysis of water amounts to 1.23 V (vs. the standard hydrogen electrode), and hence it is conceivable that the fuel electrode potential is elevated by the occurrence of the fuel deficiency.

The present inventors have interpreted that such environmental variation involving the fuel electrode (the potential elevation) causes some transformation to occur in the fuel electrode catalyst which degrades the activity. Investigation of the transformation occurring in the catalyst has resulted in an interpretation that the elevated potential results in generation of some type of coating film on the surface of the catalyst, which degrades the activity of the catalyst. Additionally, it is interpreted that the generation of the coating film is irreversible in such a way that the coating film is neither decomposed nor faded away to remain on the surface of the catalyst, inhibiting the reactivation of the catalyst.

Accordingly, the present inventors have come to an idea that it is preferable to develop a technique to suppress the formation of the coating film for the purpose of making the catalyst remain free from deactivation even when the potential of the fuel electrode is elevated. Thus, as a result of the investigation concerned, the present inventors have discovered that an intentional elevation of the loading ratio of ruthenium relative to that in the conventional fuel electrode catalyst makes it possible to suppress the coating film formation, and have thereby thought up the present invention.

More specifically, the present invention is a catalyst for use in the fuel electrode of the polymer solid electrolyte type fuel cell comprising platinum and ruthenium supported on a carbon powder carrier, and is characterized in that the loading ratio of platinum to ruthenium is from 1:2.5 to 1:4 (in molar ratio).

The loading ratio of ruthenium in the catalyst for use in the fuel electrode involved in the present invention is made higher than the conventional loading ratios (the loading ratio of platinum to ruthenium is of the order of 1:1 to 1:2). The reason for such increase of the loading ratio of ruthenium to suppress the coating film generation in the environment of the high potential is inferred such that the crystalline structure of the catalyst particle is altered when the loading ratio of ruthenium becomes high, and the coating film formation is suppressed in such a condition. However, this inference is not based on any evidence at present, but is merely based on the suppression effect confirmed by the test conducted by the present inventors. Such a loading ratio range of ruthenium as specified above comes from the following reasons: the ratio of the platinum to ruthenium of 1:2 or less overlaps with the corresponding ratios in the conventional catalysts for use in the fuel electrode, and the ratio less than 1:2.5 leads to a certain but insufficient suppression effect against the activity degradation due to fuel deficiency, in particular, to degradation in characteristics when the fuel deficiency period is extended; and on the other hand, when the ratio of platinum to ruthenium exceeds 1:4, the amount of the catalyst particles (involving both platinum particles and ruthenium particles) becomes large and the dispersion condition of the particles is degraded with an apprehension of degradation in characteristics.

As described above, the present invention provides a catalyst free from degradation in characteristics through suppressing the coating film formation on the catalyst surface even in the environment of high potential where the fuel is deficient with the aid of the elevated loading ratio of ruthenium. Incidentally, ruthenium is an element also serving to improve the resistance to catalyst poisoning due to carbon monoxide. Now, it is preferable that platinum and ruthenium are in an alloyed condition as a form of solid solution, for the purpose of more enhancing the suppression effect against the activity degradation occurring when the fuel is deficient and more enhancing the resistance to catalyst poisoning due to carbon monoxide.

Additionally, it is preferable that the catalyst involved in the present invention has a loading density of 40 to 70% for the catalyst particle comprising platinum and ruthenium in consideration of the electrode characteristics. The loading density as referred to here signifies the ratio of the mass of the catalyst particle to be supported by the carrier (in the present invention, the total weight of the mass of the platinum and the mass of the ruthenium) to the mass of the carrier in the whole catalyst. Such specification of the loading density as described above reflects the consideration both of the electrode characteristics and of the acceleration of alloying of platinum with ruthenium. More specifically, the specification of the range made to be 40% or more comes from the fact that the loading density of at least 40% or more is needed to meet the purpose of making the total amount of the catalyst as small as possible while securing a desired catalyst particle amount, in the fuel cell electrode design conducted with reference to the catalyst particle amount. Additionally, this is because a decreased loading density results in a large mutual separation between the two types of metal particles, making the alloying difficult when alloying platinum with ruthenium. On the other hand, when the loading density becomes as high as exceeding 70%, the alloy particles obtained when alloying of platinum with ruthenium become coarse and large, resulting in degradation of the cell characteristics.

Furthermore, as for the carrier made to support the catalyst, carbon powders having the specific surface areas of 600 to 1,200 $m^2/g$ are particularly preferable. This is because making the specific surface area be 600 $m^2/g$ or more permits increasing the area for the catalyst adhesion so that the catalyst particles can be dispersed widely and the effective surface area can be made high. Additionally, this is because a carrier with a specific surface area exceeding 1,200 $m^2/g$ is high in the abundance ratio of the ultramicropores (micropores smaller than about 20 Å) which reject the intrusion of the ion-exchange resin when forming the electrode so that such a carrier lowers the exploitation efficiency of the catalyst particles. Thus, the specification of such a specific surface area as described above permits dispersing the noble metal particles widely so that the activity per unit mass of the catalyst is improved, and ensures the exploitation efficiency of the catalyst.

A production method of the catalyst involved in the present invention comprises a process for making the carrier support platinum and ruthenium comprising the catalyst particle, and a process for alloying the supported platinum and ruthenium with each other. As for these processes, there is no particular restriction to the process for making the carrier support platinum and ruthenium. More specifically, the carrier can be made to support platinum and ruthenium by impregnating the carrier with a platinum salt solution and a ruthenium salt solution as conventionally performed. Incidentally, as for the order of supporting platinum and ruthenium, no particular effect is provided either by whether any one of platinum and ruthenium is supported in advance of the other or by concurrently supporting platinum and ruthenium. As for alloying the supported platinum with a supported auxiliary metal, it is appropriate to heat the carrier at 600° C. to 1,200° C. in the hydrogen reduction atmosphere in order to realize a sufficiently alloyed state. Here, it is preferable that the hydrogen concentration in the reaction atmosphere is made to be nearly 100%.

BEST MODE FOR CARRYING OUT THE INVENTION

Figure 1:
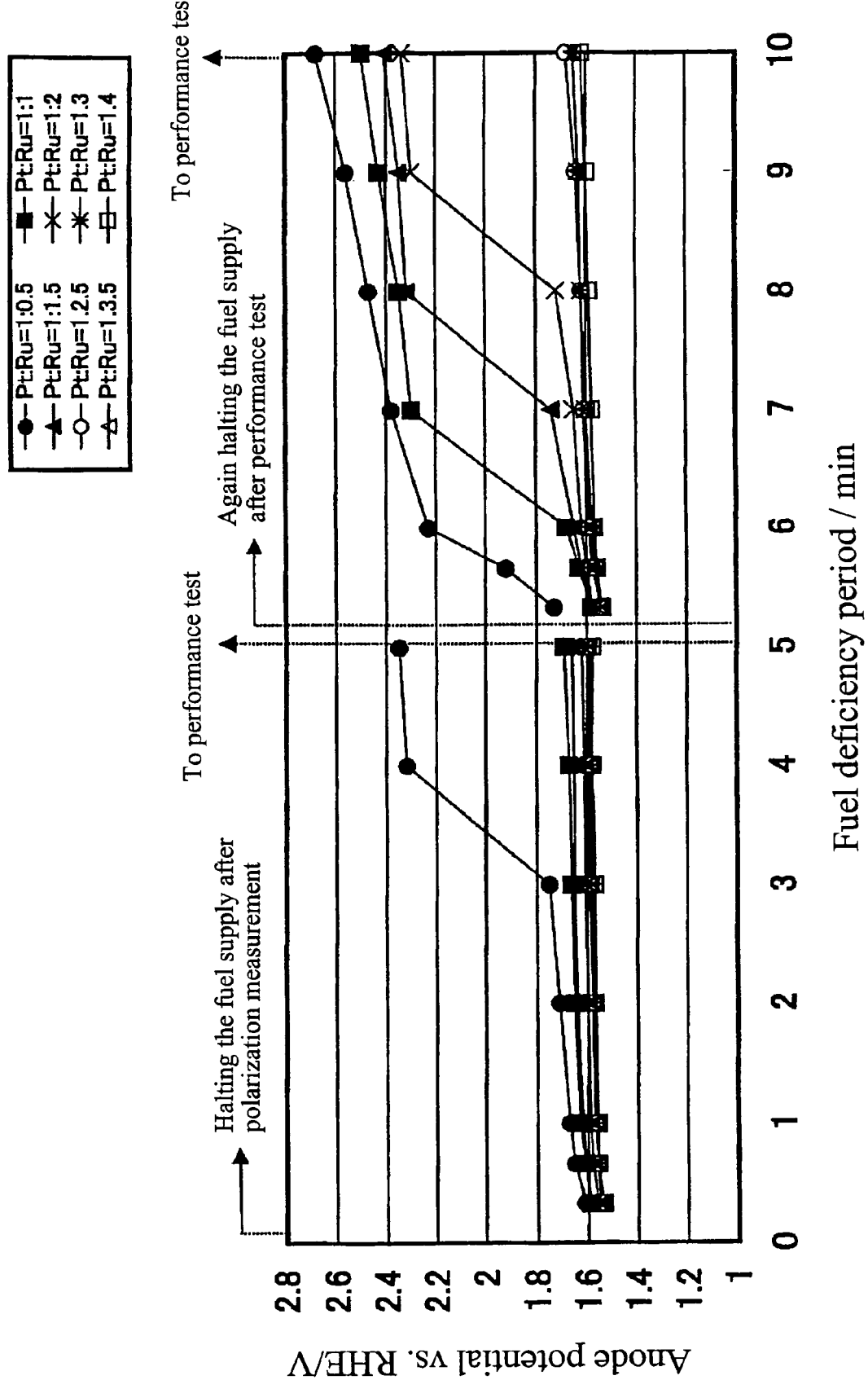
FIG. 1 is a graph showing the time-course variations of the potentials of the anodes in the fuel deficiency tests of the embodiment of the present invention.

Description will be made below on the preferred embodiment of the present invention with reference to the drawing.

In the present embodiment, platinum/ruthenium alloy catalysts having various loading ratios and loading densities were produced, and the characteristics thereof were to be confirmed. The production of the catalysts was performed by preliminarily producing platinum catalysts in which platinum was supported on the above described carbon powder; making these catalysts support ruthenium thereon through impregnating these catalysts with a ruthenium compound solution; and alloying the supported metals with each other through an additional heat treatment.

[Selection of Carriers]

The carrier used in the present embodiment was a commercially available carbon fine powder (brand name: Ketjenblack EC). The specific surface area of the carrier was measured by the BET one-point method to be 800 $m^2/g$.

[Preparation of a Platinum Catalyst]

30 g of the above described carbon powder was soaked in 900 g (the platinum content: 20 g) of a dinitrodiammine platinum solution having a platinum concentration of 2.2 wt % as a platinum solution, the solution was stirred, and then 100 ml of 100% ethanol was added as a reducing agent to the solution. The solution was stirred and mixed at the boiling point (about 95° C.) for 6 hours to make the carbon powder support platinum. Then the solution was filtered, and thus the filtered-out solid content was dried to yield a platinum catalyst.

[Supporting of Ruthenium]

Then, 10 g of the above described platinum catalyst (the platinum content: 4 g) was mixed in 100 g of a ruthenium chloride solution containing 5.2 wt % of ruthenium (the ruthenium content: 5.2 g), and the mixture was stirred, then filtered, and the filtered out solid content was dried to yield a catalyst in which platinum and ruthenium were supported.

[Heat Treatment]

The heat treatment for alloying of platinum with ruthenium was conducted for the carrier made to support platinum and ruthenium in the above described processes. The heat treatment for alloying was conducted by maintaining the carrier in a 50% hydrogen gas (the balance was nitrogen) at 900° C. for one hour.

The ratio between the supported metals in the platinum-ruthenium alloy catalyst produced by the above described processes is 1:2.5. Additionally, the loading density for platinum and ruthenium is 60%. The values of the loading ratio and loading density can be easily controlled by varying the platinum content in the platinum solution impregnated into the carrier and the ruthenium content in the ruthenium solution impregnated into the platinum catalyst.

In the present embodiment, in a manner similar to that described above, catalysts were produced in which the loading ratio between platinum and ruthenium was varied, and fuel electrodes were produced therefrom and the characteristics of the fuel electrodes were examined. The production procedures of an electrode are as follows: 1 g of the catalyst (as the weight of the carbon powder) was check-weighed and mixed in 1.2 g of a resin powder prepared through spray drying of 5% solution of an ion-exchange resin (brand name: Nafion, manufactured by DuPont, Inc.); the mixture obtained was placed in 25 mL of an aqueous 1-propanol and the mixture obtained was mixed for 100 minutes using a ball mill to yield a catalyst paste; the above described catalyst paste was applied, so as for the platinum amount to be 0.56 $g/cm^2$, by printing onto a sheet of a carbon paper impregnated with PTFE, to be used as the gas diffusion layer, having the surface layer coated with carbon and an ion-exchange resin; and furthermore, the sheet of carbon paper was dried at 100° C. and subsequently subjected to hot press at 130° C. and 20 $kg/cm^2$ for one minute to yield an electrode.

The examination of the electrode characteristics conducted in the present invention was as follows. The fuel was supplied to the fuel electrode (a half-cell), when the polarization value at the current density of 500 $mA/cm^2$ was measured; and subsequently the fuel supply was halted and in that condition the time variation of the anode potential was measured as a function of time for 5 minutes while the current was made to flow at 200 $mA/cm^2$ (hereinafter, the anode potential measurement when the fuel is deficient will be referred to as a fuel deficiency test). Then, the fuel was supplied to the electrode after being subjected to the fuel deficiency test, when the polarization value was measured at the current density of 500 $mA/cm^2$ to examine whether the electrode characteristics were degraded or not (hereinafter, the polarization value measurement conducted when the fuel was supplied to the electrode after the fuel deficiency test will be referred to as a performance test). Additionally, after the performance test, the fuel supply was once again halted and the fuel deficiency test was conducted for 5 minutes (accumulated to be 10 minutes); after the second fuel deficiency test, the fuel was once again supplied to the electrode and the performance test was conducted. The test conditions involved in these tests were as follows:

Electrode area: 7 $cm^2$

Temperature: 60° C.

Pressure: Atmospheric pressure

Fuel used for the fuel supply: 100% Hydrogen

In the first place, Table 1 shows the results of the fuel deficiency tests, among the examination results. In the fuel deficiency test, the elevation of the anode potential signifies the degradation in the electrode characteristics, and an anode potential falling within a certain low level range indicates the successful maintenance of the characteristics. Additionally, the results (polarization values) of the performance tests conducted after the fuel deficiency periods of 5 minutes and 10 minutes are shown in Table 1.

TABLE 1

| | Before | After fuel deficiency test | |
|---|---|---|---|
| Loading ratio | deficiency (mv) | Deficiency period: 5 minutes (mv) | Deficiency period: 10 minutes (mv) |
| Pt:Ru = 1:0.5 | 4 | 110 | 231 |
| Pt:Ru = 1:1 | 2 | 4 | 241 |
| Pt:Ru = 1:1.5 | 5 | 3 | 138 |
| Pt:Ru = 1:2 | 3 | 4 | 214 |
| Pt:Ru = 1:2.5 | 3 | 5 | 7 |
| Pt:Ru = 1:3 | 6 | 5 | 7 |
| Pt:Ru = 13.5 | 2 | 3 | 5 |
| Pt:Ru = 1:4 | 6 | 4 | 4 |

Among the results thus obtained, according to FIG. 1, the electrode produced with the catalyst having the platinum/ruthenium loading ratio of 1:0.5 showed the anode potential rise within 5 minutes in the fuel deficiency test, revealing the degradation in characteristics. Additionally, the electrode produced with the catalyst having the platinum/ruthenium loading ratio of 1:0.5 showed a high polarization value in the performance test, in which the fuel was once again supplied, conducted after the fuel deficiency period of 5 minutes, indicating that the irreversible degradation occurred in the electrode characteristics. The electrode also exhibited an elevation of the anode potential immediately after the resumption of the fuel deficiency test after the performance test.

According to FIG. 1 and Table 1, the electrodes produced with the catalysts having the loading ratios of 1:1 to 1:2 exhibited no degradation in characteristics in the first fuel deficiency period of 5 minutes. However, the elevation of the anode potentials was observed after the elapsed time of 6 to 8 minutes (accumulated time) in the second fuel deficiency test conducted after the performance test, and accordingly it was confirmed that these electrodes were unable to maintain the characteristics against the long period of fuel deficiency. Additionally, remarkable potential elevation was confirmed in the performance test conducted after the fuel deficiency period of 10 minutes, indicating that the electrode characteristics were degraded.

On the other hand, as FIG. 1 shows, the electrodes produced with the catalysts having the loading ratios of 1:2.5 to 1:4 exhibited no anode potential elevation even after the fuel deficiency periods of 5 and 10 minutes. In the performance tests after the fuel deficiency periods of 5 and 10 minutes, the polarization values as observed when the fuel was supplied were approximately the same as those observed at the beginning. In other words, it was confirmed that these electrodes were able to maintain the electrode characteristics even after the accumulated fuel deficiency period of 10 minutes.

INDUSTRIAL APPLICABILITY

As described above, according to the catalyst for use in the fuel electrode involved in the present invention, the irreversible activity degradation due to the fuel supply halting as observed in conventional catalysts can be suppressed. According to the present invention, the reliability of a polymer solid electrolyte type fuel cell can be improved, and the present invention can contribute to the acceleration of the practical application thereof.

The invention claimed is:

1. A catalyst for use in a fuel electrode of a polymer solid electrolyte type fuel cell consisting essentially of a platinum and ruthenium alloy supported on a carbon powder carrier, characterized in that a loading ratio between platinum and ruthenium in said alloy ranges from 1:2.5 to 1:4 (in molar ratio) and a loading density of the catalyst particle is about 60 to 70%.

2. The catalyst for use in a fuel electrode of a polymer solid electrolyte type fuel cell according to claim 1, wherein the carrier is a carbon powder having a specific surface area of 600 to 1,200 $m^2/g$.

3. A production method of a catalyst for use in a fuel electrode of a polymer solid electrolyte type fuel cell, comprising the steps of making the carrier support platinum and ruthenium, and heating said carrier at 600° C. to 1,200° C. to alloy substantially all platinum and ruthenium with each other, wherein a loading ratio between platinum and ruthenium in said alloy ranges from 1:2.5 to 1:4 (in molar ratio) and a loading density of the catalyst particle is about 60 to 70%.

\* \* \* \* \*